(12) United States Patent
Jagannathan et al.

(10) Patent No.: US 9,079,217 B2
(45) Date of Patent: Jul. 14, 2015

(54) METHOD OF MANUFACTURING DIGITAL DETECTORS

(71) Applicant: Carestream Health, Inc., Rochester, NY (US)

(72) Inventors: Seshadri Jagannathan, Rochester, NY (US); Timothy J. Tredwell, Fairport, NY (US); Eric L. Dillenbeck, Rochester, NY (US); David Gruszczynski, Webster, NY (US); Daniel M. Leusch, Rochester, NY (US); Charles M. Rankin, Penfield, NY (US); Bradley S. Jadrich, Rochester, NY (US); Brian P. Aylward, Concord, NC (US); Kevin L. Bishop, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 116 days.

(21) Appl. No.: 13/775,600

(22) Filed: Feb. 25, 2013

(65) Prior Publication Data

US 2013/0220514 A1  Aug. 29, 2013

Related U.S. Application Data

(60) Provisional application No. 61/603,980, filed on Feb. 28, 2012.

(51) Int. Cl.
*B05D 3/12* (2006.01)
*G01T 1/20* (2006.01)

(52) U.S. Cl.
CPC ... *B05D 3/12* (2013.01); *G01T 1/20* (2013.01); *G01T 1/2006* (2013.01); *G01T 1/2012* (2013.01)

(58) Field of Classification Search
CPC ............ B05D 3/12; H01J 9/205; H01J 9/221
USPC ................................... 156/67, 325
See application file for complete search history.

(56) References Cited

U.S. PATENT DOCUMENTS

| | | |
|---|---|---|
| 3,043,710 A | 7/1962 | Patten et al. |
| 3,525,621 A | 8/1970 | Miller |
| 3,615,454 A | 10/1971 | Cescon et al. |
| 3,883,747 A | 5/1975 | Murashige et al. |
| 4,204,125 A | 5/1980 | Fatuzzo et al. |

(Continued)

FOREIGN PATENT DOCUMENTS

| | | | |
|---|---|---|---|
| JP | 2010-019620 | | 1/2010 |
| JP | 2010019620 A | * | 1/2010 |

OTHER PUBLICATIONS

English machine translation of JP 2010-019620, retrieved Mar. 27, 2015.*

(Continued)

*Primary Examiner* — Timothy Kennedy (57) ABSTRACT

There is described a method of manufacturing a digital radiography panel. The method includes providing a scintillator screen and spray coating an acrylic adhesive composition on the scintillator screen. A flat panel detector and the scintillator screen with acrylic adhesive composition are compressed together at a force of about 5 psi to about 15 psi, at an atmospheric pressure of about 0.3 Torr to about 100.0 Torr for a time sufficient to affix the flat panel detector to the scintillator screen to form the digital radiography panel.

11 Claims, 1 Drawing Sheet

(56) References Cited

U.S. PATENT DOCUMENTS

| | | | |
|---|---|---|---|
| 4,547,445 | A | 10/1985 | Asahina et al. |
| 4,791,009 | A | 12/1988 | Arakawa et al. |
| 5,244,728 | A | 9/1993 | Bowman et al. |
| 5,334,843 | A | 8/1994 | Zeman |
| 5,466,536 | A | 11/1995 | Berner et al. |
| 5,683,862 | A | 11/1997 | Majumdar et al. |
| 6,346,370 | B1 | 2/2002 | Majumdar et al. |
| 6,541,773 | B1 | 4/2003 | Iwabuchi et al. |
| 7,304,317 | B2 | 12/2007 | Bermel et al. |
| 7,532,264 | B2 | 5/2009 | Yuan et al. |
| 7,902,004 | B2 | 3/2011 | Weisfield et al. |
| 2002/0168157 | A1* | 11/2002 | Walker et al. ........... 385/115 |
| 2004/0164251 | A1 | 8/2004 | Bergh et al. |
| 2004/0178350 | A1 | 9/2004 | Nagano et al. |
| 2008/0237481 | A1 | 10/2008 | Zentai et al. |
| 2009/0261259 | A1* | 10/2009 | Yip ........... 250/370.09 |
| 2010/0091149 | A1 | 4/2010 | Weisfield et al. |
| 2011/0121185 | A1 | 5/2011 | Hirai et al. |
| 2011/0133093 | A1 | 6/2011 | Jagannathan et al. |
| 2013/0220514 | A1 | 8/2013 | Jagannathan et al. |
| 2013/0221225 | A1 | 8/2013 | Jagannathan et al. |

OTHER PUBLICATIONS

International Search Report, International application No. PCT/US2013/027757, Mailing date Jun. 21, 2013, 2 pages.

* cited by examiner

METHOD OF MANUFACTURING DIGITAL DETECTORS

CROSS REFERENCE TO RELATED APPLICATIONS

This application claims the benefit of U.S. provisional application No. 61/603,980, filed Feb. 28, 2012, entitled FUNCTIONAL COATINGS FOR DIGITAL DETECTORS, which is hereby incorporated by reference in its entirety. This application relates to commonly assigned U.S. Ser. No. 13/775,639 entitled COATINGS FOR DIGITAL DETECTORS, and to commonly assigned U.S. Ser. No. 13/775,679 entitled ADHESIVE LAYER FOR DIGITAL DETECTORS; all filed simultaneously herewith and incorporated by reference herein in their entirety.

FIELD OF INVENTION

The present invention relates to digital radiography screens.

BACKGROUND

Digital radiography is an alternative to film-based imaging technologies that rely on photosensitive film layers to capture radiation exposure and thus to produce and store an image of a subject's internal physical features. With digital radiography, the radiation image exposures captured on radiation-sensitive layers are converted, pixel by pixel, to electronic image data which is then stored in memory circuitry for subsequent read-out and display on suitable electronic image display devices.

The primary objective of a radiographic imaging detector is to accurately reproduce the organ or the object that is being imaged, while exposing the patient (in medical and dental applications) or the object (in non-destructive testing) to a minimal amount of x-rays.

In digital radiography, scintillating screens are used to convert x-rays to visible radiation. The visible radiation is converted by photosensitive elements (e.g., amorphous silicon) into electrical signals that are processed by associated circuitry. In order to accurately image an organ or element, and at the same time, minimize the exposure of the patient or the object to the x-rays, it is necessary to place the scintillator screen in intimate contact with the photosensitive element, and ensure that the circuitry associated with the detection of the signal due to the radiation, is able to detect very small levels of electrical charge.

For example, creation of scintillator screens by coating a formulation of scintillator particles, polymeric binders, and other additives on a polymeric support is disclosed in U.S. Pat. Nos. 3,883,747 and 4,204,125. However, when these scintillator screens and the radiographic detectors are brought together in intimate contact, the sensitivity of the combination has to be manipulated to ensure that electrostatic discharge (ESD) events generated due to triboelectric phenomena do not induce artifacts in the radiographic image or damage the radiographic detector, which require fairly sophisticated & expensive processes to manufacture.

A number of approaches have been taken to minimize the impact of ESD events on digital radiographic detectors. The deposition of conductive coatings on the surface of the detector to spread out the charge generated by the ESD event and circuitry to dissipate the charge is described in U.S. Pat. Pub. 2010/0091149A1, U.S. Pat. Pub. 2008/0237481A1, U.S. Pat. Nos. 7,532,264 and 7,902,004. However, this approach leads to the decrease in the overall sensitivity of the photosensitive detector.

It would be desirable to minimize the probability of an ESD event due to tribocharging and to diminish the magnitude of the charge generated in the case of an ESD event, while maintaining the sensitivity of the photoelectric detector. In addition, it is necessary to mate the scintillator screen and the flat panel detector in a manner that does not degrade antistatic protection or hinder detection of the visible radiation by the flat panel detector.

SUMMARY

According to an embodiment, there is provided a method of manufacturing a digital radiography panel. The method includes providing a scintillator screen having a supporting layer, a phosphor dispersed in a polymeric binder disposed on the supporting layer, a barrier layer and an antistatic layer. The antistatic layer has a transparency of greater than about 95 percent at a wavelength of from about 400 nm to 600 nm and a surface resistivity of less than about $10^5$ ohms per square. The method includes applying an acrylic adhesive composition on the antistatic layer of the scintillator screen. A flat panel detector and the scintillator screen with the acrylic adhesive composition are compressed together at a force of about 14 psi to about 75 psi for a time sufficient to affix the flat panel detector to the scintillator screen to form the digital radiography panel. The flat panel detector and the scintillator screen are at an atmospheric pressure of about 0.3 Torr to about 100.0 Torr during the compressing of the flat panel detector and the scintillating screen. The acrylic adhesive composition cures to form an adhesive layer having a thickness of from about 5 μm to about 15 μm. The adhesive layer has a transmittance of greater than about 95 percent at a wavelength of from about 400 nm to about 600 nm.

According to another embodiment there is provided a method of manufacturing a digital radiography panel. The method includes providing a scintillator screen and spray coating an acrylic adhesive composition on the scintillator screen. A flat panel detector and the scintillator screen with acrylic adhesive composition are compressed together at a force of about 14 psi to about 75 psi, at an atmospheric pressure of about 0.3 Torr to about 100.0 Torr for a time sufficient to affix the flat panel detector to the scintillator screen to form the digital radiography panel.

According to another embodiment there is provided a method of manufacturing a digital radiography panel. The method includes providing a scintillator screen having a supporting layer, a phosphor dispersed in a polymeric binder disposed on the supporting layer and a barrier layer. An antistatic composition of poly(3,4-ethylenedixythiophene)-poly(styrene sulfonate), a polymer, and water is coated on the barrier layer. The antistatic composition is dried to form an antistatic layer having a transparency of greater than about 95 percent at a wavelength of from about 400 nm to 600 nm and a surface resistivity of less than about $10^{10}$ ohms per square. An acrylic adhesive composition is applied on the antistatic layer, A flat panel detector and the scintillator screen with acrylic adhesive composition are compressed together at a force of about 14 psi to about 75 psi, at an atmospheric pressure of about 0.3 Torr to about 100.0 Torr for a time sufficient to affix the flat panel detector to the scintillator screen to form the digital radiography panel.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The issue of minimizing ESD events is important in many areas of industrial and consumer importance, including photography. ESD events have been recognized as a primary cause for the accumulation of charge on film or paper surfaces, which lead to the attraction of dirt and visible physical defects.

It is recognized that that the triboelectric charge can be dissipated effectively by incorporating one or more electrically-conductive "antistatic" layers in photographic films. Many approaches of using antistatic layers on one or to both sides of the support (photographic film or paper base) or as subbing layers either beneath or on the side opposite to the light-sensitive silver halide emulsion layers have been utilized. In some industries, such as the packaging industry, the antistatic agent is incorporated into the photographic film base itself. U.S. Pat. No. 6,346,370 describes the use of antistatic layers in photographic films.

A wide variety of electrically-conductive materials, with a wide range of conductivities are available for use in these photographic antistatic layers. The materials are generally categorized as (i) ionic conductors and (ii) electronic conductors. In ionic conductors (such as simple inorganic salts, alkali metal salts of surfactants, ionic conductive polymers, polymeric electrolytes containing alkali metal salts, or colloidal metal oxide sols) charge is transferred by the bulk diffusion of charged species through an electrolyte. The drawback of these ionic conductors is that their resistivity is dependent on temperature and humidity, and many of these materials are water-soluble and would leach out of if the moisture level too high, resulting in a loss of antistatic function. Also, the conductivity of ionic conductors is not very high, and is suitable for antistatic dissipation applications, where the magnitude of charge that needs to dissipate is not high, and the time constant for dissipation does not have to be very short.

The conductivity of antistatic layers of electronic conductors depends on electron mobility (contain conjugated polymers, semiconductive metal halide salts, semiconductive metal oxide particles, etc.) rather than ionic mobility and is independent of humidity. The conductivity of these materials can be very high, and is suitable for antistatic dissipation applications, where the magnitude of the charge to be dissipated is high and the time constant for dissipation needs to be short. However, these materials tend to be difficult to formulate and coat and often impart unfavorable physical characteristics, such as color, increased brittleness and poor adhesion, etc.

Within the antistatic patent literature for photographic applications, it is seen that some of the antistatic layers alleviate some problems but may aggravate some others. For example, U.S. Pat. No. 3,525,621 teaches how to impart antistatic performance to an aqueous coating composition using silica particles, in combination with an alkylaryl polyether sulfonate, but the high solubility of the alkylaryl polyether sulfonate in an aqueous medium causes leaching of other materials in the coating during processing. U.S. Pat. No. 5,244,728 teaches a binder polymer including an addition product of alkyl methacrylate, alkali metal salt and vinyl benzene which, when incorporated in an antistatic layer for photographic paper, provides solution to the above problem of backmark retention, but introduces spliceability issues. U.S. Pat. Nos. 5,683,862 and 5,466,536 teach of the use of a mixture of polymers and copolymers for good printabilty, but this formulation mixture compromises the stability of the antistatic layer. Further, the adhesion of the antistatic (or any other) layer to a surface is influenced by the surface characteristics, as well as the formulation, as evidenced in U.S. Pat. No. 4,547,445, which discloses a layer containing gelatin and an inorganic pigment for improved ink-retaining characteristics, and good adhesion to polyethylene-coated photographic paper, but which does not exhibit good adhesion to biaxially oriented polypropylene-coated photographic paper. Antistatic protection in photographic applications is not transferrable to digital radiography because the problems associated with ESD events in digital radiographic detectors are unique, and require inventive solutions, that resolve these problems, without introducing additional problems.

Disclosed herein is a layer structure and a method of manufacturing a digital radiography (DR) panel that minimizes the magnitude of the charge generated by any stray ESD event. Certain attributes are required for an antistatic layer structure suitable for use in a DR panel. The antistatic layer structure must be transparent to radiation in the 400-600 nm wavelength region of the electromagnetic spectrum. The antistatic layer is coated on the surface of a scintillator screen. The surface resistivity of the antistatic layer must be less than about $10^{10}$ ohms per square. In addition, the scintillator screen and the flat panel detector must be mated in a manner that does not degrade the antistatic protection or interfere with the detection of visible light by the flat panel detector.

Figure 1:
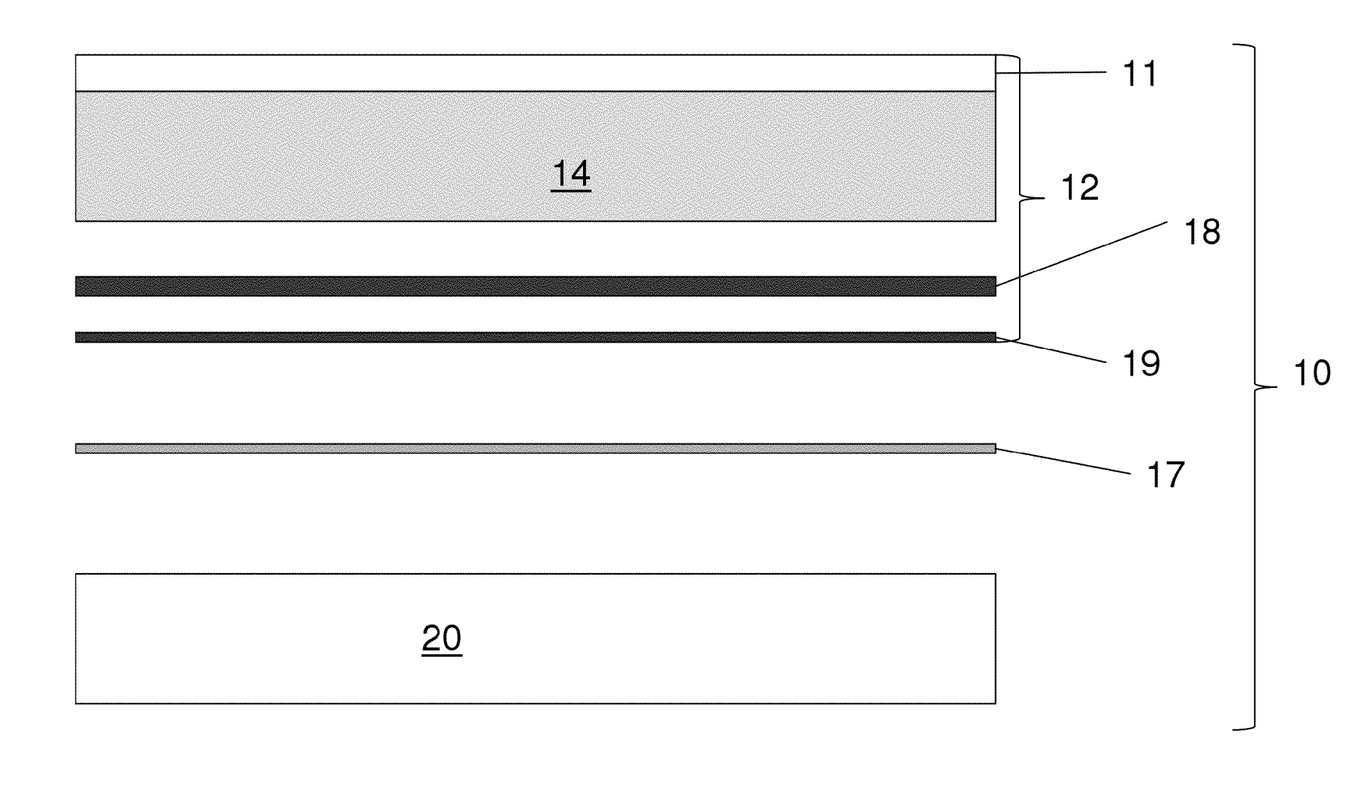
FIG. 1 is a schematic illustration of a digital radiographic detector.

FIG. 1 shows a sectional view of component layers of a digital radiography (DR) panel 10. Scintillator screen 12 has a scintillator layer 14 formed on a support 11 that is highly transmissive to incident x-ray radiation. Flat panel detector (FPD) 20 detects visible radiation. Interposed between the scintillator screen 12 and the FPD 20 is an adhesive layer 17 provided to bind or mate the scintillator screen 12 to the FPD 20. In embodiments, the scintillator screen 12 includes a barrier layer 18 and an antistatic layer 19. Scintillator layer 14 responds to incident x-ray R by emitting photons toward FPD 20.

Support 11 can be made of borosilicate glass, aluminosilicate glass, fusion-formed glass, metal, or plastic, or combinations thereof.

The scintillating screen 12 is responsive to the X-rays passing through an object to produce light which illuminates the FPD to provide signals representing an X-ray image. The scintillating screen 12 includes a layer 14 of a prompt emitting phosphor dispersed as a particulate in a polymeric matrix. Suitable prompt emitting phosphors are well known, for example, rare-earth oxysulfides doped with a rare-earth activator. The present invention preferably uses emitting phosphors such as $Gd_2O_2S:Tb$, $Gd_2O_2S:Eu$, $Gd_2O_3:Eu$, $La_2O_2S:Tb$, $La_2O_2S$, $Y_2O_2S:Tb$, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, and (Y,Gd)$BO_3$:Eu, or combinations thereof. In embodiments gadolinium oxy sulfides $Gd_2O_2S:Tb$, $Gd_2O_2S:Eu$, $Gd_2O_3:Eu$ are preferred. However, any suitable prompt emitting phosphor material, including doped phosphor materials, can be used in any of the embodiments described herein. A blend of different phosphors can also be used. The median particle size of the phosphor particle is generally between about 0.5 μm and about 40 μm. A median particle size of between 1 μm and about 20 μm is preferred for ease of formulation, as well as optimizing properties, such as speed, sharpness and noise.

The phosphor layer 14 can be prepared using conventional coating techniques, where the phosphor powder is mixed with a solution of a resin binder material and coated onto a support 11. The binder can be chosen from a variety of known organic polymers that are transparent to X-rays, stimulating, and emitting light. Polymeric binders commonly employed in the art include sodium o-sulfobenzaldehyde acetal of poly(vinyl alcohol); chloro-sulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. However, any conventional ratio phosphor to binder can be employed. Generally, thinner phosphor layers and sharper images are realized when a high weight ratio of phosphor to binder is employed. Phosphor-to-binder ratios are in the range of about 7:1 to about 35:1. In embodiments, the phosphor-to-binder ratio is from about 7:1 to about 25:1.

Scintillator screens are prepared by coating a scintillator solution on the support 11 to form the phosphor layer 14. The scintillator solution can be applied using any conventional coating techniques known in the art. For example, the scintillator solution can be applied onto the support 11 by spray coating, dip-coating, doctor blade coating, roll coating, knife coating, or slot die coating. Suitable manufacturing techniques are described, for example, in U.S. Pat. No. 7,304,317, which is herein incorporated by reference in its entirety.

In order to provide suitable antistatic protection it is necessary to provide a barrier layer 18 on the scintillator screen 12. The barrier layer 18 must not absorb moisture. In addition, the barrier layer cannot be water soluble. The barrier layer comprises one or more non-moisture absorbing polymer binders selected from the group consisting of polyethylene terephthalate (PET), cellulose diacetate (CDA), ethylene vinyl acetate (EVA) and polyvinyl butyraldehyde (BUTVAR). The barrier layer has a thickness of from about 1 μm and about 10 μm. The barrier layer 18 can extend over and be used to seal the edges of the phosphor layer 14 to the support 11. The barrier layer is disposed directly on the phosphor layer. The barrier layer 18 is coated from a solvent solution. The barrier layer materials can be applied using the same slot coating techniques as used with the phosphor layer 14. The barrier layer solution or dispersion can be applied onto the phosphor layer 14 by spray coating, dip-coating, doctor blade coating, roll coating, knife coating, or slot die coating. The barrier layer has a transparency of greater than 95 percent at a wavelength of from about 400 nm to 600 nm.

In embodiments, when polyethylene terephthalate (PET) is used as the barrier layer, the preferred thickness range is from about 2 μm to about 10 μm. In embodiments, when cellulose diacetate (CDA) is used as the barrier layer, the preferred thickness range is about 1 μm to about 5 μm. In embodiments, when ethylene vinyl acetate (EVA) is used as the barrier layer, the preferred thickness range is about 2 μm to about 10 μm. In embodiments, when polyvinyl butyraldehyde (BUTVAR) is used as the barrier layer, the preferred thickness range is about 2 μm to about 10 μm.

The antistatic layer 19 is disposed on the barrier layer 18. The antistatic layer comprises poly(3,4-ethylenedixythiophene)-poly(styrene sulfonate) (available from Heraeus Company as PEDOT/PSS) dispersed in a polymer selected from the group consisting of a polyester and a polyurethane. Poly(3,4-ethylenedixythiophene)-poly(styrene sulfonate) is a conductive polymer that is transmissive in the wavelength region of 400 nm to 600 nm. The antistatic layer has a transparency of greater than 95 percent at a wavelength of from about 400 nm to 600 nm. In embodiments, the transparency is greater than 94 percent at a wavelength of from about 400 nm to 600 nm. The layer thickness of the dried antistatic layer is from about 0.1 μm to about 0.3 μm. The coverage of the poly(3,4-ethylenedixythiophene)-poly(styrene sulfonate) is from about 0.1 micrograms/$cm^2$ to about 0.5 micrograms/$cm^2$. The ratio of polymer to poly(3,4-ethylenedixythiophene)-poly(styrene sulfonate) from about 0.5 to about 1.5. The surface resistivity is less than $10^{10}$ ohms per square. This is the maximum value that the surface resistivity can be and still protect the DR panel 10 against ESD events. In embodiments, the surface resistivity is less than $10^8$ ohms per square, or $10^5$ ohms per square.

The antistatic layers can be coated by any suitable method including spray coating, dip-coating, doctor blade coating, roll coating, knife coating, slot die coating or spin coating. Spin coating is a procedure used to apply uniform thin films to flat substrates. An excess amount of a solution is placed on the substrate, which is then rotated at high speed in order to spread the solution by centrifugal force. Rotation is continued while the fluid spins off the edges of the substrate, until the desired thickness of the film is achieved. The higher the angular speed of spinning, the thinner the film. The thickness of the film also depends on the concentration of the solution and the solvent.

Drying of any of the layers (phosphor layer 14, barrier layer 18 or antistatic layer 19) described can be achieved by a number of different techniques; including, room temperature evaporation, hot plates, ovens, UV, or IR exposure. The drying technique is typically formulation specific, depending on solvents used and the presence of other addenda. For example: coating solutions that utilize volatile solvents (low boiling temperature solvents) can be dried through low temperature solvent evaporation. While coatings that utilize non-volatile solvents (high boiling temperature solvents) may require the use of elevated temperature or any of the other above mentioned techniques to accelerate the solvent evaporation process.

The Flat Panel Detector (FPD) 20, also referred to as a detector array, may include a PIN diode as photosensor. Multiple photosensors are used to detect the radiation emitted from the scintillating phosphors and form a photosensor array. The FPD 20 can include various layers such as a p-doped layer, an I-layer (intrinsic or undoped layer), and an n-doped layer formed on a metal layer which is itself supported by a substrate, typically glass such as Corning 1737 display glass. A transparent ITO (Indium-Tin Oxide) layer provides conductive traces. A passivation layer adds insulation and surface uniformity. The scintillator screen 12 is maintained in physical contact between scintillator screen 12 and FPD 20 through an optical adhesive. It is important that physical contact be maintained across the entire active area of the FPD 20, so that uniform and efficient transfer of the converted visible light is achieved. The glass of the FPD 20 is typically 0.7 mm thick, and susceptible to breakage, especially for a large-area, such as 43 cm by 43 cm panels. In embodiments, FPD 20 can include CMOS and CCD as part of the photosensor array.

The Flat Panel Detector (FPD) 20, also referred to as a detector array, may include a PIN diode as photosensor. Multiple photosensors are used to detect the radiation emitted from the scintillating phosphors and form a photosensor array. The FPD 20 can include various layers such as a p-doped layer, an I-layer (intrinsic or undoped layer), and an n-doped layer formed on a metal layer which is itself supported by a substrate, typically glass such as Corning 1737 display glass. A transparent ITO (Indium-Tin Oxide) layer provides conductive traces. A passivation layer adds insulation and surface uniformity. The scintillator screen 12 is maintained in physical contact between scintillator screen 12 and FPD 20 through an optical adhesive. It is important that physical contact be maintained across the entire active area of the FPD 20, so that uniform and efficient transfer of the converted visible light is achieved. The glass of the FPD 20 is typically 0.7 mm thick, and susceptible to breakage, especially for a large-area, such as 43 cm by 43 cm panels. In embodiments, FPD 20 can include CMOS and CCD as part of the photosensor array.

Phosphor layer 14 responds to incident x-ray radiation by emitting photons toward FPD 20. As long as there is good optical coupling between scintillator screen 12 and FPD 20, a sufficient amount of the emitted signal is directed toward FPD 20.

An adhesive layer 17 mates the scintillator screen 12 and FPD 20. The dimensional requirements of the FPD 20 panel may be as large as 43 cm by 43 cm (1865 square centimeters). This requires a uniform adhesive layer 17 that contains no gaps, voids or bubbles and has a constant thickness. Where an air gap occurs, the light transmission and the spatial resolution are significantly degraded.

The adhesive layer 17 must be stable and not impact the optical properties or antistatic properties of the FPD 20. The adhesive layer 17 must provide some dimensional rigidity; however, it must not be so rigid that it distorts the FPD 20. The adhesive layer 17 must be uniform and without voids.

Disclosed herein is an acrylic adhesive layer disposed on the scintillator screen 12. The acrylic adhesive layer mates the scintillator screen 12 and the FPD 20. The adhesive layer 17 has a thickness of from about 5 μm to about 15 μm and a transmittance of greater than 95 percent at a wavelength of from about 400 nm to 600 nm. In an embodiment the adhesive formulations includes polyacrylate adhesive (GMS®1151) dispersed or solubilized in an organic solvent. Gelva-Multipolymer Solution (GMS®) 1151 is available from Monsanto Company. Suitable acrylic adhesives are available from numerous suppliers, including but not limited to: Henkel, Cytec, 3M, Dow and Permabond.

Acrylic adhesives provide excellent environmental resistance and fast-setting times when compared to other adhesive resins systems. Acrylic Adhesives are available in single component or two-component forms. Acrylic adhesives are also available in both emulsion and solvent-based versions. Important specifications for acrylic adhesives include; ability to flow under low pressure, tack (measure of the ability to rapidly wet a substrate), peel or shear (measure of adhesive cohesive failure), curing temperature, environmental (temperature, humidity, UV) resistance, solvent resistance, the viscosity of the adhesive, the required setting or curing time, and the optical properties of the adhesive. The correct balance of these attributes determines the suitability of the adhesive for the application. In particular, for the embodiments described herein; optical properties (95% transmittance at 400 nm to about 600 nm); ability to flow under pressure and thus avoid creating voids in the cured adhesive layer; tack (substrate bond strength); peel (cohesive strength); and the curing temperature (processing temperature of from about 66° C. to about 177° C.) are most critical. An example of an acrylic adhesive that meets these requirements is Henkel GMS-1151 (formerly a Cytec product). This adhesive is supplied as a solvent based solution that can be diluted with a suitable solvent (Toluene is preferred). Dilution to a percent solids of less than 40 is achievable when toluene is used as a dilution solvent. The ability to dilute the adhesive enables application by a wide number of coating methods. The preferred method for applying Henkel GMS-1151 is by spray coating, wherein the adhesive is diluted to between about 3 weight percent solids to about 4 weight percent solids.

Coating of the adhesive layer 17 described herein can be by spin coating, spray coating, slot coating, dip coating or other coating techniques. Drying of the adhesive layer can be achieved by a number of different techniques; including, room temperature evaporation, hot plates, ovens, UV, or IR exposure. The drying technique is typically formulation specific, depending on solvents used and the presence of other addenda. For example: coating solutions that utilize volatile solvents (low boiling temperature solvents) can be dried through low temperature solvent evaporation. While coatings that utilize non-volatile solvents (high boiling temperature solvents) may require the use of elevated temperature or any of the other above mentioned techniques to accelerate the solvent evaporation process.

After the adhesive layer has been coated on the scintillator screen 12, it is needs to be mated and affixed to FPD 20. The process for mating includes placing the FPD 20 and the scintillator screen 12 in a fixture wherein they are held apart utilizing, for example a spring loaded holder. The lamination chamber is heated to about 66° C. to about 177° C., or in embodiments to between about 79° C. to about 93° C. The fixture is placed in the heated lamination chamber and the pressure within the chamber is reduced to an atmospheric pressure of about 0.3 Torr to about 100.0 Torr, or in embodiments from about 0.3 Torr to about 10 Torr The process for mating includes compressing the flat panel detector 20 and the scintillator screen 12 with acrylic adhesive composition thereon together at a force of about 14 psi to about 75 psi, or in embodiments from about 15 psi to about 24 psi. The force between the scintillator screen 12 and FPD 20 must be enough to allow for the acrylic adhesive to cure without creating voids. Too much force could damage the scintillator screen 12 or the FPD 20. The low pressure during the compression of the scintillator screen 12 and the FPD 20 helps avoid voids from being formed in the adhesive layer. In embodiments, the FPD 20 and the scintillator screen 12 with the acrylic adhesive composition are compressed together by the expansion of a diaphragm within the lamination chamber. The scintillator screen 12 and FPD 20 are compressed together for a time sufficient to cure the adhesive and affix the FPD 20 to the scintillator screen 12 to form the digital radiography panel 10. The time is from about 5 minutes to about 60 minutes, or in embodiments form about 10 minutes to about 15 minutes. The acrylic adhesive composition cures to form an adhesive layer having a thickness of from about 5 µm to about 15 µm wherein the adhesive layer has a transmittance of greater than 95 percent at a wavelength of from about 400 nm to about 600 nm. Because the scintillator screen 12 and FPD 20 are of different materials, their thermal expansion coefficients are different. After curing of the acrylic adhesive and returning the DR panel to room temperature, strain results due to the differences in thermal expansion between the scintillator screen 12 and the FPD 20. The adhesive layer must accommodate this strain by forming a bond that is not too rigid, else the DR panel will distort and in catastrophic cases break. In embodiments described herein the distortion is measured by bow of the DR panel 10.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Scintillator Screens

CSH Scintillator Screen (Representative of Scintillator Screen Surface Without an Overcoat that Serves as a Barrier Layer for Subsequent Coatings (Elements 11 and 14 in FIG. 1)):

A drum of SU-21-572 Permuthane dispersed in solvent from Stahl USA was coated onto a PET substrate and the solvent was flashed off. The dried permuthane is then placed into a mixture of an approximate mixture of Dichloromethane and Methanol (93:7) at an approximate ratio of 12.5:87.5 for an approximately 2 weeks to allow the permuthane to fully dissolve. The fully dissolved permuthane is placed into a 9 gallon pressurized vessel and an air driven lightening mixer with an impeller is used to make a homogeneous solution. To this permuthane mixture, GOS 3010-03 from Nichia Corp. was added together at a ratio of 77:23 (GOS:permuthane) and allowed to mix using the air driven lightening mixer with an impeller. GOS is a gadolinium oxy sulfide of the formula $Gd_2O_2S$:Tb. The resulting slurry is coated on a 10 mil polyester support, using the slot coater, and transported through a series of air dryers with a temperature range between about 35° C. to about 46° C. for approximately 8 minutes.

Scintillator coatings for the following examples were prepared using a lab-scale slot coater. The barrier layer materials (CDA, EVA, BUTVAR) polyvinyl acetate (PVAc), polyvinyl alcohol (PVOH) and gelatin were applied using the same slot coating techniques, but over the dried scintillator layer. The antistatic layers were coated using a lab scale spin coater (Laurell Spin Coater Model WS-650).

The coating solutions utilized in the generation of the inventive and comparative examples were solvent-based solutions, therefore, drying was primarily performed by thermal and/or evaporative techniques. In the case of drying or curing, the temperature was above room temperature, and an inert gas environment was utilized if necessary through use of an inert gas oven. In addition, the air flow around the coated layer was laminar.

Solution ingredients were mixed in a controlled manner, and agitated using standard mixing methods (e.g., prop mixing, magnetic bar, sonicator, or roller mill) for a specified amount of time. Then, the stability of the dispersion observed visually, using a light source behind a clear container and observing if there is the noticeable presence of agglomerations or settling of materials to the bottom of the container.

DRZ+ Screen (Representative of Scintillator Screen Surface with a PET Overcoat that Serves as a Barrier Layer for Subsequent Coatings):

Mitsubishi provides three levels of scintillator screens that utilize prompt emitting phosphors, DRZ-Std, DRZ-Plus and DRZ-High. All three screens have a common product structure; a supporting layer, a phosphor layer and a protective layer. The supporting layer is a "plastic base" that can range from 188 µm to 250 µm; the DRZ+ scintillator has a 250 µm base thickness. The phosphor layer is comprised of a proprietary phosphor and binder formulation that ranges in thickness from 140 µm to 310 µm; the DRZ+ scintillator has a 208 µm phosphor layer thickness. The protective layer is a polyethylene (PET) sheet that covers the phosphor layer and ranges in thickness from 6 µm to 9 µm.

Optical Measurements

Visual transmittance was measured using a Perkin Elmer Lambda 3B UV/Vis Spectrophotometer. This system was used to measure both dispersions and coated samples.

Surface Resistivity

The measurement of surface resistivity of the coated samples was conducted in accordance to American Society for Testing and Materials (ASTM) standard D257-07. Resistivity measurement equipment from Prostat Corporation was utilized for all testing. The resistivity measurement kit included the PRS-801 Resistivity meter, PRF-911 Concentric Ring Set (which included the required test leads and connectors), PTB-920 Dual Test Bed and the PRS-801-W 5 lb. weight. The instrument was calibrated before each use using a shunt that was provided by the manufacturer.

Charge Decay Measurement

The measurement of charge decay was conducted in accordance with the general practices outlined in FTM Standard 101C, method 4046.1. Measurement equipment from Prostat Corporation was utilized for all testing. The equipment utilized included: the PFM-711A Electrostatic Field Meter, the CPM-720A Charge Plate Assembly, Conductive Probes, the PGA-710 Autoanalysis System, the PCS-730 Charging Source and associated connecting cables. All instruments were calibrated at the factory. The PFM-711A Field meter has a zero balance, this was adjusted and verified to be zero before each test.

Clean Room Wiping Protocol

A clean room towel is wetted with isopropyl alcohol (IPA). The towel was then used to wipe the antistatic layer coated scintillator screen. A constant and repeatable wiping normal force is generated by wrapping the towel around a 1 kilogram cylindrical weight, that is about 38 mm diameter. The weight/towel is placed on an 83 mm wide scintillator and is dragged across the surface of the screen. This process is repeated 3 times—each time using a different portion of the towel. The ability to withstand abrasion from clean room wiping is demonstrated by the Wipe test. The scintillator screen must be abrasion resistant to maintain ESD protection.

The experiments described below show the need for a non-moisture absorbing and non-water soluble barrier layer over a scintillator layer having a prompt emitting phosphor dispersed in a polymeric binder. Without the barrier layer, the antistatic layer does not provide the proper level of conductivity due to the porous nature of the scintillator layer 14. The antistatic material has a propensity to diffuse into the scintillator layer 14, distorting the conductivity network, and thus increasing the surface resistivity. In order to reduce the surface resistivity under these circumstances, it is necessary to either saturate the concentration of the antistatic material that diffuses into the scintillator layer 14, which would require a significant increase in the concentration while reducing transparency of the scintillator layer 14, or introduce a barrier layer 18 between the scintillator layer 14 and the antistatic layer 19. The barrier layer 18 prevents diffusion of the antistatic material into the scintillator layer 14, while maintaining the transparency requirements.

The active ingredient in the antistatic layer formulation of an aqueous dispersion of Clevios Pedot (PEDOT/PSS) available from Heraeus Company. The antistatic species in PEDOT/PSS is poly(3,4-ethylenedixythiophene)-poly(styrene sulfonate). The addenda of the antistatic formulations are outlined in the Table 1 below.

TABLE 1

| Ingredient | Wt % |
|---|---|
| 1X Binder Formulation | |
| Water | 79.96 |
| Clevios PH 1000 | 7.69 |
| AQ55D | 4.95 |
| Dynol | 2.4 |
| Ethylene Glycol | 5 |
| 2X Binder Formulation | |
| Water | 74.25 |
| Clevios PH 1000 | 14.29 |
| AQ55D | 4.60 |
| Dynol | 2.23 |
| Ethylene Glycol | 4.63 |
| 4X Binder Formulation | |
| Water | 64.97 |
| Clevios PH 1000 | 25 |
| AQ55D | 4.02 |
| Dynol | 1.95 |
| Ethylene Glycol | 4.06 |
| 8X Binder Formulation | |
| Water | 51.97 |
| Clevios PH 1000 | 40 |
| AQ55D | 3.22 |
| Dynol | 1.56 |
| Ethylene Glycol | 3.25 |

The Eastman AQ55 addenda was dispersed in distilled water, heated to 70° C. and stirred for a minimum of 2 hours until it was completely dissolved and homogeneous. Once the AQ55 solution is complete, the antistatic layer formulation is measured in the ratios provided in the above table. Dynol 604 from Air Products and Chemicals, Allentown, Pa. is used as a coating aid. Ethylene Glycol is added to the mixture to act as a conductivity enhancer. The solution is mixed by any number of techniques including the use of a roller mill, and spin coated.

Comparative Example 1

The antistatic formulations shown described above were coated on the CSH Scintillator Screen described above. The surface resistivity and percent transmittance in the 400-600 nm range are shown in Table 2 below.

Comparative Example 2

A gelatin coating was coated on the CSH Scintillator Screen. A gelatin overcoat layer was prepared as follows. 144.5 grams of Gel 34, a lime processed ossein was dissolved into 1760.5 grams of distilled water for 120 minutes. This mixture was heated up to 50° C. and held for 20 minutes. After 20 minutes, the temperature is lowered to 40° C. and a prop mixer was inserted into the container. The mixer was turned on for 10 minutes and a surfactant package was added to the mixture. This mixture was slot die coated on top of the scintillator screen at a wet thickness of 0.005". After the overcoat solution was applied, it was dried in place with a platen temperature of 50° C. for 20 minutes.

The antistatic formulations shown in Table 1 were coated on the CSH Scintillator Screen with the gelatin overcoat. The surface resistivity and percent transmittance in the 400-600 nm range are shown in Table 2 below.

Comparative Example 3

A polyvinyl alcohol coating was coated on the CSH Scintillator Screen as a barrier layer. 20 g of Sigma Aldrich Poly (vinyl alcohol, MW 89,000-98,000) was weighed out and mixed with 360 g of Distilled Water and mixed using a prop mixer for 2 hours at 88° C. This mixture was slot die coated on top of the scintillator screen at a wet thickness of 0.005". After the overcoat solution was applied, it was dried in place with the platen temperature of 40° C. for 20 minutes. The antistatic formulations shown described in Table 1 were coated on the CSH screen with the polyvinyl alcohol overcoat. The surface resistivity and percent transmittance in the 400-600 nm range are shown in Table 2 below.

Inventive Example 1

The antistatic formulations shown and identified in Table 1 above were coated on the DRZ+ screen. The surface resistivity and percent transmittance in the 400-600 nm range are shown in Table 2 below.

Inventive Example 2

An ethylene vinyl acetate (EVA) coating was coated on the CSH Scintillator Screen as a barrier layer. 5 grams of DuPont™ Elvax 150 is an ethylene vinyl acetate copolymer resin was weighed out and mixed with 95 grams of Toluene and roller milled for 24 hours. This mixture was slot die coated on top of the scintillator screen described at a wet thickness of 0.005". After the solution was applied, it was dried in place with the platen temperature of 40° C. for 20 minutes. The antistatic formulations shown in Table 1 were coated on the CSH Scintillator Screen with the EVA overcoat. The surface resistivity and percent transmittance in the 400-600 nm range are shown in Table 2 below.

Inventive Example 3

A cellulose diacetate (CDA) coating was coated on the CSH Scintillator Screen as a barrier layer. 2 grams of the Eastman™ Cellulose Acetate (CA-398-3) was weighed out and mixed with 98 grams of NitroMethane and roller milled for 2 hours. This mixture was slot die coated on top of the CSH Scintillator Screen at a wet thickness of 0.005". After the overcoat solution was applied, it was dried with the platen temperature of 40° C. for 20 minutes. The antistatic formulations shown in Table 1 were coated on the CSH Scintillator Screen with the EVA overcoat. The surface resistivity and percent transmittance in the 400-600 nm range are shown in Table 2 below.

Inventive Example 4

A polyvinyl butyraldehyde (Butvar) coating was coated on the CSH Scintillator Screen as a barrier layer. 5 grams of Butvar® 76 (Polyvinyl butyral resin) was weighed out and mixed with 95 grams of Acetone and roller milled for 24 hours. This mixture was slot die coated on top of the CSH Scintillator Screen at a wet thickness of 0.005". After the overcoat solution was applied, it was dried with the platen temperature of 12° C. for 20 minutes. The antistatic formulations shown in Table 1 were coated on the CSH Scintillator Screen with the EVA overcoat. The surface resistivity and percent transmittance in the 400-600 nm range are shown in Table 2 below.

sive layer (ethyl vinyl acetate). 5.16 grams of Dupont EVA 150 was dispersed in 80.84 grams of toluene and coated and dried.

Prior to coating, the coated DRZ+ screen was cut into individual sheets of approximately 7×11 cm² and placed onto the heated vacuum platen (controlled to 40° C.). The USI Prism Ultracoat 300EH Spray Coater was used to coat the adhesive formulation. The EVA was coated and dried onto the individual sheets to form an adhesive layer having a 10

TABLE 2

| Sample | Coating surface | Antistat Coating Formulation | Minimum transmittance in the 400-800 nm range (measured by coating the antistat formulation on a glass substrate) | Surface Resistivity ($\Omega/\square$) | Coating Meets Minimum Resistivity Specification <1.0 E5 $\Omega/\square$ & Minimum Transmission Requirement |
|---|---|---|---|---|---|
| Comparative Example 1 | a film of GOS in permuthane | 1X | 95% | 1.36E+06 | No - Fail Resistivity |
| | | 2X | 94% | 3.84E+06 | No - Fail Resistivity |
| | | 4X | 92% | 3.50E+04 | No - Fail Transmission |
| | | 8X | 88% | 1.05E+04 | No - Fail Transmission |
| Comparative Example 2 | a thin film of gelatin coated over a film of GOS in permuthane | 1X | 95% | 2.00E+11 | No - Fail Resistivity |
| | | 2X | 94% | 9.65E+09 | No - Fail Resistivity |
| | | 4X | 92% | 2.20E+09 | No - Fail Resistivity & transmission |
| | | 8X | 88% | 3.55E+08 | No - Fail Resistivity & transmission |
| Comparative Example 2 | a thin film of polyvinyl alcohol coated over a film of GOS in permuthane | 1X | 95% | 8.83E+08 | No - Fail Resistivity |
| | | 2X | 94% | 4.75E+08 | No - Fail Resistivity |
| | | 4X | 92% | 1.47E+08 | No - Fail Resistivity & transmission |
| | | 8X | 88% | 1.67E+06 | No - Fail Resistivity & transmission |
| Inventive Example 1 | a thin film of PET coated over a film of GOS in permuthane layer | 1X | 95% | 5.65E+07 | No - Fail Resistivity |
| | | 2X | 94% | 2.05E+04 | Yes |
| | | 4X | 92% | 2.45E+04 | No - Fail Transmission |
| | | 8X | 88% | 9.00E+03 | No - Fail Transmission |
| Inventive Example 2 | a thin film of CDA coated over a film of GOS in permuthane layer | 1X | 95% | 7.35E+07 | No - Fail Resistivity |
| | | 2X | 94% | 1.60E+04 | Yes |
| | | 4X | 92% | 1.95E+04 | No - Fail Transmission |
| | | 8X | 88% | 8.80E+03 | No - Fail Transmission |
| Inventive Example 3 | a thin film of EVA coated over a film of GOS in permuthane layer | 1X | 95% | 2.35E+06 | No - Fail Resistivity |
| | | 2X | 94% | 5.85E+04 | Yes |
| | | 4X | 92% | 1.50E+04 | No - Fail Transmission |
| | | 8X | 88% | 3.90E+03 | No - Fail Transmission |
| Inventive Example 4 | a thin film of Bulvar coated over a film of GOS in permuthane layer | 1X | 95% | 5.58E+07 | No - Fail Resistivity |
| | | 2X | 94% | 6.70E+04 | Yes |
| | | 4X | 92% | 2.20E+04 | No - Fail Transmission |
| | | 8X | 88% | 8.50E+03 | No - Fail Transmission |

In the results shown in Table 2, the goal was to find an antistatic layer that provided excellent surface resistivity and transmission. The goal was to have surface resistivity under $10^5$ ohms per square. Previous tests with poly (3,4-ethylene dioxythiophene) as an antistatic agent showed surface resistivities that were not acceptable. Zelec® electroconductive powders were tested and provided acceptable surface resistivity, however, the transmission in the 400 nm to 600 nm wavelength was unacceptable. As the scintillator screen 12 is mated with a FPD 20, there can be an insulating effect caused by the adhesive layer. In order to overcome this effect it is necessary in the tests above to be well under $10^{10}$ ohms per square so the DR panel will have protection from ESD events. A highly conductive antistatic agent allows for thinner coating layers.

Having an effective antistatic layer is the first step to providing a DR panel that is protected from ESD events. The examples below provide an adhesive formulation that does not degrade the antistatic protection and effectively mates the scintillator screen 12 with the FPD 20.

Comparative Example 4

The antistatic formulation in Table 1 (2×) was coated on the DRZ+ screen followed by the application of an olefinic adhemicron thickness. The coating was allowed to dry for a minimum of 1 hour before use to enable evaporation of the toluene.

Comparative Example 5

The antistatic formulation shown in Table 1 (2×) was coated on the DRZ+ screen, followed by the application of a butyraldehyde adhesive layer (Butvar). 4 grams of Solutia Butvar-76 was dispersed in a mixture of 86.4 grams of toluene and 9.6 grams of ethyl alcohol and coated and dried.

Prior to coating, the DRZ+ screen was cut into individual sheets of approximately 7×11 cm² and placed onto the heated vacuum platen (controlled to 40° C.). The USI Prism Ultracoat 300EH Spray Coater was used to coat the adhesive formulation. The Butvar was coated and dried onto the individual sheets to form an adhesive layer having a 10 micron thickness. The coating was allowed to dry for a minimum of 1 hour before use to enable evaporation of the toluene.

Comparative Example 6

The antistatic formulation shown in Table 1 (2×) was coated on the DRZ+ screen, followed by the application a polyurethane adhesive layer (Permuthane (PU in Table 3)).

Permuthane was mixed in 60 weight percent toluene and 40 weight percent isopropyl alcohol solvent package and coated and dried.

Prior to coating, the DRZ+ screen was cut into individual sheets of approximately 7×11 cm$^2$ and placed onto the heated vacuum platen (controlled to 55° C.). A hopper coater was used to coat the adhesive formulation. The Permuthane was coated and dried onto the individual sheets to form an adhesive layer having a 10 micron thickness. After the coating was completed, the samples were covered for 1 minute to help reduce drying defects.

Inventive Example 5

The antistatic formulations in Table 1 (2×) was coated on the DRZ+ screen, followed by the application of an acrylic adhesive layer (GMS 1151) available from Cytec. 6.93 grams of Cytec GMS 1151 was dispersed in 79.63 grams of toluene and coated and dried.

Prior to coating, the DRZ+ screen was cut into individual sheets of approximately 7×11 cm$^2$ and placed onto the heated vacuum platen (controlled to 40° C.). The USI Prism Ultracoat 300EH Spray Coater was used to coat the adhesive formulation. The GMS 1151 was coated and dried onto the individual sheets to form an adhesive layer having a 10 micron thickness. The coating was allowed to dry for a minimum of 1 hour before use to enable evaporation of the toluene.

adhesion without inducing cohesive or adhesive failure of the antistatic or phosphor layers, or introducing any bow in the resulting DR panel.

The next set of examples provide manufacturing information and further evidence that acrylic adhesives are suitable for mating scintillator screens 12 with FPD 20.

An antistatic layer was applied to the DRZ+ screen. The active ingredient in the antistatic layer formulation is poly(3, 4-ethylenedixythiophene)-poly(styrene sulfonate) (Clevios PEDOT). The addenda of the antistatic formulations are the 1× binder formulation in Table 1. The Eastman AQ55 addenda was dispersed in distilled water, heated to 70° C. and stirred for a minimum of 2 hours until it was completely dissolved and homogeneous. The antistatic formulation was measured in the ratios provided in Table 1 (1×). The Dynol 604 from Air Products and Chemicals, Allentown, Pa. was used as a coating aid. Ethylene Glycol was added to the mixture to act as a conductivity enhancer.

The antistatic layers were coated using a lab scale spray coater (Ultrasonic Systems Inc., Prism 300EH (P300-1) Spray Coater). The spray coating process used an atomization head attached to a multi-axis translational stage, positioned above the scintillator screen.

The antistatic layers were dried in a Nitrogen purged oven. The oven was purged (20 minutes at 200 standard cubic feet per hour (scfh) and then the temperature was ramped to 90° C. Ramp times varied between 10 and 60 minutes. The DRZ+

TABLE 3

| | Coating surface | Antistatic Layer | Adhesive Type | Adhesive Layer Thickness (microns) | Transmittance after adhesive layer (400-600 nm) | Surface resistivity before adhesive layer (Ω/sq.) | Surface resistivity after adhesive layer (Ω/sq.) | % change in resistivity |
|---|---|---|---|---|---|---|---|---|
| Comp. Ex. 4 | DRZ+ | 2X | EVA | 10 | 95% | 9.5E+06 | 1.35E+11 | +1.4E+6 |
| Comp. Ex. 5 | | | Butvar | 10 | 95% | 6.48E+06 | 2.4E+12 | 3.7E+10 |
| Comp. Ex. 6 | | | PU | 6 | 95% | 1.63E+06 | 4.53E+10 | +2676 |
| Ex. 4 | | | GMS | 10 | 95% | 5.08E+06 | 2.87E+06 | −45 |

Table 3 shows that an acrylic adhesive has minimal impact on the resistivity of the DR panel 10. Ethyl vinyl acetate (EVA), butyraldehyde and polyurethane adhesives increase the resistivity of the of the DR panel 10 by at least a factor of 2500. The increase reduces the effectiveness of the antistatic layer and makes the panel susceptible to ESD events. The primary purpose of the antistatic layer is to dissipate away from the detector panel any tribocharge that may generated. In order to achieve this purpose, it is necessary that the surface resistivity (on the surface of the adhesive layer) is as low as it is on the surface of the antistatic layer. The olefinic (EVA), butryal (Butvar) and the urethane (permuthane) adhesives screen the conductivity of the antistatic layer significantly and thereby increase the surface resistivity. The adhesive layer is an order of magnitude greater or more than the surface resistivity of the antistatic layer when EVA, Butvar or permuthane is used. However, the acrylic adhesive (GMS) does not significantly screen the conductivity of the antistatic layer, and the surface resistivity of the acrylic adhesive layer is equivalent to the surface resistivity of the antistatic layer. The acrylic adhesive layer maintains the conductivity of the antistatic layer as the adhesive layer improves the conductivity of surface. The acrylic adhesive layer is transmissive in the visible light wavelength (400 nm to 600 nm) and provides good screen with the antistatic coating was maintained at 90° C. for 10 minutes then the oven temperature was ramped down to room temperature.

Commercially available adhesives were selected based on the properties of the adhesive. Properties including; optical clarity, propensity to oxidize (change color), adhesive type (pressure or temperature sensitivity) and adhesion strength were used as initial selection criteria. The adhesives were then formulated for application by the spray coating process.

Adhesive formulations were generated by first determining the solubility solvents of the adhesive. The adhesives, which can be in pellet form, or as a highly viscous liquid were combined with a solvent at different ratios. The adhesive solution viscosities were measured using a Brookfield viscometer. Solutions with viscosities ranging from 2 to 15 centipoise were evaluated for suitability for use with the spray coating process. Suitability was determined through spray coating trials with each formulation; evaluating atomization, evaporation rates and uniformity of the resultant coating. Final formulations for each adhesive are listed in Table 4 for comparative examples and inventive examples.

The adhesive layers were coated the DRZ+ screen having an antistatic layer coated and dried as described above, using a lab scale spray coater (Ultrasonic Systems Inc., Prism 300EH (P300-1) Spray Coater). The spray coating process includes an atomization head attached to a multi-axis translational stage, positioned DRZ+ scintillator screen having the described antistatic layer. The multi-axis translational stage is used to precisely locate and move the spray head over the DRZ+ scintillator screen.

A vacuum lamination process was utilized to attach the adhesive coated scintillator to the flat panel radiographic detector. A fixture is used to ensure proper placement of the scintillator screen onto the radiographic detector and to provide uniform lamination without any voids (trapped air spaces or non-laminated areas). The scintillator and radiographic detector were assembled into the lamination fixture as described herein. The lamination fixture holds the scintillator screen and the flat panel radiographic detector. The scintillator screen and the flat panel radiographic detector were spaced apart at distance of about 1 mm to about 15 mm apart, or from about 3 mm to about 8 mm. The lamination fixture is placed into the Optec DPL-24 laminator. The vacuum time (minutes), pressure (psi), pressure time (minutes) and lamination temperature are programmed into the DPL-24 and the lamination cycle is commenced. The chamber was subjected to vacuum conditions of from about 0.3 Torr to about 2.0 Torr for about 2 minutes. During this time, air is removed from the gap between the scintillator and the detector panel. The pressure cycle was commenced. While the vacuum is maintained below the diaphragm of the laminator, pressure of about 10 psi, is applied to the diaphragm. The diaphragm expands and compresses the fixture springs and brings the radiographic detector and scintillator into direct contact—initiating the lamination process. At the end of the cycle, the vacuum and pressure are released enabling removal of the fixture from the laminator. When the lamination cycle is complete, the fixture is removed from the laminator.

The fixture is disassembled and the laminated radiographic detector was removed from the fixture.

The fixture includes an upper and a lower half. The adhesive coated scintillator is placed in the lower portion of the fixture. The lower fixture provides positioning features which constrain the scintillator and thus define its position. The lower fixture enables the placement of compression pads of varying thickness and durometer (hardness) beneath the scintillator. The thickness and durometer required is dependent on the scintillator material. The DRZ+ scintillator screen had an elastomeric compression pad with a durometer range of between about 50 and about 70 Shore A and a thickness of between about 0.025 and about 0.040 inches. The preferred properties of the elastomeric compression pad were 60 Shore A and 0.032 inches thick.

The upper and lower fixtures were aligned through alignment pins and were held apart by a spring system. The radiographic detector was place inside the upper fixture with the active side facing down. The fixture had an area cut out where the screen is able to protrude through the upper fixture (when the fixture is compressed) enabling lamination. Locating features and a spring loaded pushing mechanism are used to place the radiographic detector in a repeatable position. The elastomeric compression pad was placed above the radiographic detector to enable uniform pressure on the detector. The final component of the assembly is a rigid compression plate. This plate enables compression of the fixture and subsequent contact of the scintillator to the radiographic detector without damage to the radiographic detector.

Bow Measurement

The assessment of the quality impact of the adhesives used in the lamination process included an assessment of the "bow" (curvature of the laminated panel) after the lamination process. Panel bow is caused by the different coefficients of thermal expansion between the scintillator screen and the flat panel radiographic detector. At the temperatures utilized in the lamination process, the scintillator expands significantly more than the panel. As the laminated assembly cools the return of the scintillator to its size at room temperature can result in a deflection or "bow" in the panel. Bow results in stresses at the interface between scintillator and the detector panel which can result in detector damage.

To measure the bow in the panel after the lamination process, the laminated panel was placed panel side down on Rahn G8382 Surface Plate (Grade: Toolroom B, with overall flatness 393.4 microns). Perfekt Punch Graduated metric gauge pins are used to measure the space between the Surface Plate and the corner of the panel. The panel bow is presented as the minimum, maximum and average bow values for the four corners of the panel in Table 2.

Void Assessment

The assessment of the quality impact of the adhesives used in the lamination process included an assessment of voids after the lamination process. Voids are areas of the scintillator that are not in direct contact with the panel. Voids are a concern because of their propensity to change size/shape under different environmental conditions. The changes in size and shape require re-calibration of the panel to eliminate imaging artifacts.

Voids are assessed visually using laminations on test glass. The test glass is the same thickness and material used in the actual product. Visual assessment is performed using reflected light, and observations are made for center voids (voids in the center of the scintillator excluding the outside 3 mm edge area) and edge voids (voids within 3 mm from the edge of the scintillator). Center void propensity is expressed as Yes/No assessment because no center voids are allowed in the final product. Edge void propensity is expressed as "percent edge void" and is calculated using the following equation:

$$\text{Edge Void \%} \ 100 = \frac{\text{(Length of the edge voids along the perimeter of the screen)}}{\text{(Total perimeter of the scintillator screen)}} *$$

Comparative Example 7

The antistatic formulations in Table 1 (1x) were coated on the DRZ+ screen, followed by an adhesive layer of ethyl vinyl acetate. 5.16 grams of Dupont EVA 150 was dispersed in 80.84 grams of Toluene. The solution was roll milled for about 2 hours to ensure a homogeneous mixture.

The DRZ+ screen was coated as a full size screen (357.7 mm×428.9 mm) and placed onto the heated vacuum platen (controlled to 27° C.) of the USI Prism Ultracoat 300EH Spray Coater. Individual sheets of approximately 72×72 mm$^2$ were coated under the same conditions. The spray coater was programmed to delivery 13.5 cc/min of the EVA solution to the ultrasonic head. A 10 micron thick coating of EVA was generated. The coating was allowed to dry for a minimum of 1 hour before use.

The screens were laminated to glass panels, as described above. The lamination process conditions included; a 2 minute vacuum dwell, a 15 minute pressure dwell at 10 psig and the heated platens were set to 235° F. The full sized (357.7 mm×428.9 mm) laminated samples were then evaluated for physical characteristics; bow and voids. The small samples (72×72 mm) were laminated to small glass panels, which simulated detector panels. These laminated samples were used to assess the applicability of the laminated panel for practical use/evaluation.

Comparative Example 8

The antistatic formulations in Table 1 (1×) were coated on the DRZ+ screen, followed by an adhesive layer of butyraldehyde (Butvar). 4 grams of Solutia Butvar-76 was dispersed in a mixture of toluene, 86.4 grams, and ethyl alcohol, 9.6 grams. The solution was roll milled for about 2 hours to ensure a homogeneous mixture.

The DRZ+ screen was coated as a full size screen (357.7 mm×428.9 mm) and placed onto the heated vacuum platen (controlled to 27° C.) of the USI Prism Ultracoat 300EH Spray Coater. Individual sheets of approximately 72×72 mm² were coated under the same conditions. A 10 micron thick coating of Butvar 76 was generated. The coating was allowed to dry for a minimum of 1 hour before use to enable evaporation of the solvents. The coating was allowed to dry for a minimum of 1 hour before use.

The screens were laminated to glass panels, as described above. The lamination process conditions included; a 2 minute vacuum dwell, a 15 minute pressure dwell at 10 psig and the heated platens were set to 135° C. The full sized (357.7 mm×428.9 mm) laminated samples were then evaluated for physical characteristics; bow and voids. The small samples (72×72 mm) were laminated to small glass panels, which simulated detector panels. These laminated samples were used to assess the applicability of the laminated panel for practical use/evaluation.

Comparative Example 9

The antistatic formulations in Table 1 (1×) were coated on the DRZ+ screen, followed by an adhesive layer of polyurethane. An 8 weight percent formulation of permuthane (polyurethane) in a mixture of 60 weight percent toluene and 40 weight percent n-propyl alcohol was prepared. The solution was roll milled for about 2 hours to ensure a homogeneous mixture.

The DRZ+ screen was coated as a full size screen (357.7 mm×428.9 mm) and placed onto the heated vacuum platen (controlled to 27° C.) of the USI Prism Ultracoat 300EH Spray Coater. Individual sheets of approximately 72×72 mm² were coated under the same conditions. A 10 micron thick coating of permuthane was generated. After the permuthane is coated it was covered for 1 minute to help reduce drying defects such as reticulation. The cover is removed and dried on the 55° C. vacuum plate for an additional 9 minutes. It was then taken off the vacuum plate and placed onto an oven at 90° C. for an additional 20 minutes. It is then ready to be tested.

The screens were laminated to glass panels, as described above. The lamination process conditions included; a 2 minute vacuum dwell, a 15 minute pressure dwell at 10 psig and the heated platens were set to 135° C. The full sized (357.7 mm×428.9 mm) laminated samples were then evaluated for physical characteristics; bow and voids. The small samples (72×72 mm) were laminated to small glass panels, which simulated detector panels. These laminated samples were used to assess the applicability of the laminated panel for practical use/evaluation.

Inventive Example 5

The antistatic formulations in Table 1 (1×) were coated on the DRZ+ screen, followed by an adhesive layer of polyacrylate adhesive (GMS®1151). Gelva-Multipolymer Solution (GMS®) 1151 is available from Monsanto Company for. 6.93 grams of Cytec GMS®1151 was dispersed in 79.63 grams of toluene. The solution was roll milled for about 2 hours to ensure a homogeneous mixture.

The DRZ+ screen was coated as a full size screen (357.7 mm×428.9 mm) and placed onto the heated vacuum platen (controlled to 27° C.) of the USI Prism Ultracoat 300EH Spray Coater. Individual sheets of approximately 72×72 mm² were coated under the same conditions. A 10 micron thick coating of acrylic (GMS1151) was generated. The coating was allowed to dry for a minimum of 1 hour before use to enable evaporation of the solvents. The coating was allowed to dry for a minimum of 1 hour before use.

The screens were laminated to glass panels, as described above. The lamination process conditions included; a 2 minute vacuum dwell, a 15 minute pressure dwell at 10 psig and the heated platens were set to 135° C. The full sized (357.7 mm×428.9 mm) laminated samples were then evaluated for physical characteristics; bow and voids. The small samples (72×72 mm) were laminated to small glass panels, which simulated detector panels. These laminated samples were used to assess the applicability of the laminated panel for practical use/evaluation.

The results of the comparative examples and inventive examples are shown in Table 4. The lamination vacuum time was 2 minutes for each sample and the lamination pressure was 10 psi as measured by a gauge. The criteria for successful lamination is an average panel bow of less than 0.25 mm, less than 1% edge void and no interior voids.

TABLE 4

| Example | Adhesive | Pressure time (min) | Lamination Temperature (° C.) | Edge Void (%) | Interior Voids (Yes/No) | Panel Bow (mm) | Min. Panel Bow (mm) | Max. Panel Bow (mm) |
| --- | --- | --- | --- | --- | --- | --- | --- | --- |
| Inventive Example 5 | Acrylic | 15 | 79 | 0.32 | No | 0.04 | 0.04 | 0.04 |
|  | Acrylic | 10 | 91 | 4.07 | No | 0.04 | 0.04 | 0.04 |
|  | Acrylic | 15 | 91 | 0.0 | No | 0.04 | 0.04 | 0.04 |
|  | Acrylic | 15 | 91 | 0.38 | No | 0.04 | 0.04 | 0.04 |
|  | Acrylic | 15 | 91 | 0.0 | No | 0.05 | 0.04 | 0.06 |
|  | Acrylic | 10 | 113 | 0.06 | No | 0.10 | 0.04 | 0.25 |
| Comparative Example 7 | EVA | 15 | 79 | 8.96 | No | 4.37 | 2.45 | 6.41 |
|  | EVA | 15 | 91 | 0.0 | No | 5.48 | 1.77 | 9.51 |
|  | EVA | 15 | 113 | 0.0 | No | 4.85 | 4.15 | 5.89 |
|  | EVA | 15 | 113 | 0.0 | No | 7.08 | 3.89 | 10.81 |
|  | EVA | 10 | 113 | 2.93 | Yes | 4.01 | 1.45 | 6.85 |
|  | EVA | 10 | 113 | 0.32 | Yes | 3.49 | 2.20 | 5.32 |

TABLE 4-continued

| Example | Adhesive | Pressure time (min) | Lamination Temperature (° C.) | Edge Void (%) | Interior Voids (Yes/No) | Panel Bow (mm) | Min. Panel Bow (mm) | Max. Panel Bow (mm) |
|---|---|---|---|---|---|---|---|---|
| Comparative | Butvar | 15 | 91 | 32.23 | Yes | 9.24 | 6.95 | 11.47 |
| Example 8 | Butvar | 15 | 124 | 0.0 | Yes | 9.44 | 5.35 | 13.59 |
| Comparative | PU | 15 | 91 | 43.0 | Yes | N/A | N/A | N/A |
| Example 9 | PU | 15 | 113 | 32 | Yes | N/A | N/A | N/A |

Table 4 show that acrylic adhesive provides a bow of the DR panel 10 of about 0.25 mm or less. The edge voids are less than 1% with no interior voids. Thus, the acrylic adhesive is superior to the EVA, Butvar and permuthane for mating scintillator screens with detectors.

In accordance with one embodiment, there can be provided a digital radiography panel that can include a scintillator screen having a supporting layer; a phosphor dispersed in a polymeric binder disposed on the supporting layer, a barrier layer disposed on the polymeric binder comprising a non-moisture absorbing polymer selected from the group consisting of polyethylene terephthalate, cellulose diacetate, ethylene vinyl acetate and polyvinyl butyraldehyde; an antistatic layer disposed on the barrier layer, the antistatic layer comprising a poly(3,4-ethylenedixythiophene)-poly(styrene sulfonate) dispersed in a polymer selected from the group consisting of a polyester and a polyurethane wherein the antistatic layer has a transparency of greater than 95 percent at a wavelength of from about 400 nm to 600 nm; and a flat panel detector disposed on the antistatic layer.

In accordance with one embodiment, there can be provided a digital radiography panel including a scintillator screen that can include a supporting layer; a phosphor dispersed in a polymeric binder disposed on the supporting layer, a barrier layer; and an antistatic layer disposed on the barrier layer, the antistatic layer having a transparency of greater than 95 percent at a wavelength of from about 400 nm to 600 nm and a surface resistivity of less than $10^{10}$ ohms per square; an acrylic adhesive layer disposed on the scintillator screen wherein the acrylic adhesive layer has a thickness of from about 5 μm to about 15 μm wherein the adhesive layer has a transmittance of greater than 95 percent at a wavelength of from about 400 nm to about 600 nm; and a flat panel detector disposed on the acrylic adhesive layer.

In accordance with one embodiment, there can be provided a method of manufacturing a digital radiography panel that can include providing a scintillator screen having a supporting layer, a phosphor dispersed in a polymeric binder disposed on the supporting layer, a barrier layer and an antistatic layer, the antistatic layer having a transparency of greater than about 95 percent at a wavelength of from about 400 nm to 600 nm and a surface resistivity of less than about $10^{10}$ ohms per square; applying an acrylic adhesive composition on the antistatic layer of the scintillator screen; and compressing a flat panel detector and the scintillator screen with acrylic adhesive composition together at a force of about 14 psi to about 75 psi, at an atmospheric pressure of about 0.3 Torr to about 100.0 Torr for a time sufficient to affix the flat panel detector to the scintillator screen to form the digital radiography panel wherein the acrylic adhesive composition cures to form an adhesive layer having a thickness of from about 5 μm to about 15 μm wherein the adhesive layer has a transmittance of greater than about 95 percent at a wavelength of from about 400 nm to about 600 nm.

In accordance with certain exemplary embodiments, a digital radiography panel has a bow of less than about 0.25 mm. In one embodiment, an antistatic layer disposed on a barrier layer. In one embodiment, a scintillator screen can include a surface resistivity less than $10^{10}$ ohms/square. In one embodiment, an adhesive layer disposed between an antistatic layer and a flat panel detector. In one embodiment, an antistatic layer comprises a surface resistivity of less than $10^{10}$ ohms per square. In one embodiment, a flat panel detector comprises a photosensor array. In one embodiment, an acrylic adhesive layer has a surface resistivity of less than $10^{10}$ ohms per square. In one embodiment, an acrylic adhesive composition includes a polyacrylate adhesive in an organic solvent. In one embodiment, the acrylic adhesive composition comprises an organic solution having a solid content of less than 40 weight percent. In one embodiment, an atmospheric pressure for compressing is from about 0.3 Torr to about 2.0 Torr.

Other embodiments of the present teachings will be apparent to those skilled in the art from consideration of the specification and practice of the present teachings disclosed herein. In addition, while a particular feature of the invention can have been disclosed with respect to only one of several implementations, such feature can be combined with one or more other features of the other implementations as can be desired and advantageous for any given or particular function. The term "about" indicates that the value listed can be somewhat altered, as long as the alteration does not result in nonconformance of the process or structure to the illustrated embodiment. Further, "exemplary" indicates the description is used as an example, rather than implying that it is an ideal. It is intended that the specification and examples be considered as exemplary only, with the true scope and spirit of the present teachings being indicated by the following claims.

What is claimed is:

1. A method of manufacturing a digital radiography panel, the method comprising:
    providing a scintillator screen comprised of a supporting layer, a phosphor layer, a barrier layer, and an antistatic layer, the phosphor layer disposed on the supporting layer and includes phosphor dispersed in a polymeric binder, the antistatic layer having a transparency of greater than about 95 percent at a wavelength of from about 400 nm to 600 nm and a surface resistivity of less than about $10^{10}$ ohms per square;
    applying an acrylic adhesive composition on the antistatic layer of the scintillator screen; and
    compressing a flat panel detector and the scintillator screen with the acrylic adhesive composition together at a force of about 14 psi to about 75 psi, at an atmospheric pressure of about 0.3 Torr to about 100.0 Torr for a time sufficient to affix the flat panel detector to the scintillator screen to form the digital radiography panel wherein the acrylic adhesive composition cures to form an adhesive layer having a thickness of from about 5 μm to about 15

μm wherein the adhesive layer has a transmittance of greater than about 95 percent at a wavelength of from about 400 nm to about 600 nm.

2. The method of claim 1 wherein the thickness of the adhesive layer is from about 5 microns to about 15 microns.

3. The method of claim 1, wherein the digital radiography panel has a bow of less than about 0.25 mm.

4. The method of claim 1, wherein the antistatic layer comprises a poly(3,4-ethylenedixythiophene)-poly(styrene sulfonate) dispersed in a polymer selected from the group consisting of a polyester and a polyurethane, and wherein the antistatic layer has a thickness of about 0.1 microns to about 0.3 microns.

5. The method of claim 4 wherein the antistatic layer is formed by spray coating a composition of poly(3,4-ethylenedixythiophene)-poly(styrene sulfonate), a polymer, water and ethylene glycol on the barrier layer and drying the composition.

6. The method of claim 1, wherein the barrier layer comprises a non-moisture absorbing polymer selected from the group consisting of: polyethylene terephthalate, cellulose diacetate, ethylene vinyl acetate and polyvinyl butyraldehyde, and wherein the barrier layer has a thickness of less than about 1 micron.

7. The method of claim 1, wherein the phosphor is selected from the group consisting of: $Gd_2O_2S:Tb$, $Gd_2O_2S:Eu$, $Gd_2O_3:Eu$, $La_2O_2S:Tb$, $La_2O_2S$, $Y_2O_2S:Tb$, $CsI:Tl$, $CsI:Na$, $CsBr:Tl$, $NaI:Tl$, $CaWO_4$, $CaWO_4:Tb$, $BaFBr:Eu$, $BaFCl:Eu$, $BaSO_4:Eu$, $BaSrSO_4$, $BaPbSO_4$, $BaAl_{12}O_{19}:Mn$, $BaMgAl_{10}O_{17}:Eu$, $Zn_2SiO_4:Mn$, $(Zn,Cd)S:Ag$, $LaOBr$, $LaOBr:Tm$, $Lu_2O_2S:Eu$, $Lu_2O_2S:Tb$, $LuTaO_4$, $HfO_2:Ti$, $HfGeO_4:Ti$, $YTaO_4$, $YTaO_4:Gd$, $YTaO_4:Nb$, $Y_2O_3:Eu$, $YBO_3:Eu$, $YBO_3:Tb$, and $(Y,Gd)BO_3:Eu$, and wherein the polymeric binder is selected from the group consisting of: sodium o-sulfobenzaldehyde acetal of poly(vinyl alcohol); chloro-sulfonated poly(ethylene); bisphenol poly(carbonates); copolymers of bisphenol carbonates and poly(alkylene oxides); aqueous ethanol soluble nylons; poly(alkyl acrylates and methacrylates): copolymers of poly(alkyl acrylates and methacrylates); poly(vinyl butyral) and poly(urethane) elastomers.

8. A method of manufacturing a digital radiography panel comprising:
providing a scintillator screen having a supporting layer, a phosphor layer, and a barrier layer, the phosphor layer including phosphor dispersed in a polymeric binder, the phosphor layer disposed on the supporting layer, the phosphor layer intermediate the supporting layer and the barrier layer;
coating an antistatic composition of poly(3,4-ethylenedixythiophene)-poly(styrene sulfonate), a polymer, and water on the barrier layer;
drying the antistatic composition to form an antistatic layer having a transparency of greater than about 95 percent at a wavelength of from about 400 nm to 600 nm and a surface resistivity of less than about $10^5$ ohms per square;
applying an acrylic adhesive composition on the antistatic layer of the scintillator screen; and
compressing a flat panel detector and the scintillator screen with the acrylic adhesive composition together at a force of about 14 psi to about 75 psi, at an atmospheric pressure of about 0.3 Torr to about 100.0 Torr for a time sufficient to affix the flat panel detector to the scintillator screen to form the digital radiography panel.

9. The method of claim 8, wherein the acrylic adhesive composition forms a layer with a thickness of from about 5 microns to about 15 microns, wherein the antistatic layer has a thickness of about 0.1 microns to about 0.3 microns, wherein the compressing is at a temperature of from about 66° C. to about 177° C.

10. The method of claim 8, wherein the acrylic adhesive composition comprises an organic solution having a solids content of less than 40 weight percent.

11. The method of claim 8, wherein the atmospheric pressure is from about 0.3 Torr to about 2.0 Torr.

* * * * *

UNITED STATES PATENT AND TRADEMARK OFFICE
CERTIFICATE OF CORRECTION

PATENT NO. : 9,079,217 B2 Page 1 of 1
APPLICATION NO. : 13/775600
DATED : July 14, 2015
INVENTOR(S) : Seshadri Jagannathan et al.

It is certified that error appears in the above-identified patent and that said Letters Patent is hereby corrected as shown below:

In The Specification

Columns 13 and 14,    Replace "1.36E+06" with -- 1.35E+06 --
Table 2, Column 5, line 1

Columns 13 and 14,    Replace "1.50E+04" with -- 1.60E+04 --
Table 2, Column 5, line 23

Columns 13 and 14,    Replace "5.58E+07" with -- 5.56E+07 --
Table 2, Column 5, line 25

Signed and Sealed this
Ninth Day of February, 2016

Michelle K. Lee
*Director of the United States Patent and Trademark Office*